US010805489B2

(12) United States Patent
Kubota

(10) Patent No.: US 10,805,489 B2
(45) Date of Patent: Oct. 13, 2020

(54) IMAGE FORMING APPARATUS

(71) Applicant: SHARP KABUSHIKI KAISHA, Sakai, Osaka (JP)

(72) Inventor: Kazuhisa Kubota, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/601,923

(22) Filed: Oct. 15, 2019

(65) Prior Publication Data
US 2020/0137244 A1 Apr. 30, 2020

(30) Foreign Application Priority Data
Oct. 31, 2018 (JP) .................................. 2018-205483

(51) Int. Cl.
*H04N 1/00* (2006.01)
*H04N 1/44* (2006.01)

(52) U.S. Cl.
CPC ..... *H04N 1/00514* (2013.01); *H04N 1/00474* (2013.01); *H04N 1/00517* (2013.01); *H04N 1/4433* (2013.01); *H04N 2201/0094* (2013.01)

(58) Field of Classification Search
CPC ........... H04N 1/00514; H04N 1/00517; H04N 1/00501
See application file for complete search history.

(56) References Cited

U.S. PATENT DOCUMENTS

2006/0039037 A1* 2/2006 Shibata ................ H04N 1/0035
358/426.01
2020/0036847 A1* 1/2020 Sakanashi .......... H04N 1/00482

FOREIGN PATENT DOCUMENTS

JP 2006-039470 A 2/2006

* cited by examiner

*Primary Examiner* — Benjamin O Dulaney
(74) *Attorney, Agent, or Firm* — ScienBiziP, P.C.

(57) ABSTRACT

An image forming apparatus includes: an image former; a display showing an image formation setting screen; an operator accepting a user command; a storage; and a controller. If the operator accepts a setting registration command when the display shows the setting screen, the controller stores setting contents of the setting screen along with an image of the setting screen in the storage. If the operator accepts a setting call command, the controller makes the display show a list of images of setting screens related to the setting contents stored in the storage. If the operator accepts a command to select an image from the list of images of setting screens, the controller makes the display show a setting screen, to which setting contents related to a selected image are reflected.

5 Claims, 10 Drawing Sheets

IMAGE FORMING APPARATUS

BACKGROUND OF THE INVENTION

Field of the Invention

The present invention relates to an image forming apparatus.

Description of the Background Art

Conventionally, various authentication methods such as IC card authentication, login authentication, and quick authentication are available as user authentication methods for electronic devices such as a multifunction device, a personal computer, and a smartphone.

The quick authentication is the authentication method that further simplifies the conventional login authentication requiring a login name (or account) and a password, and, as illustrated in FIG. 3, is the authentication method that allows a user to log in simply by selecting an appropriate user icon.

Unlike the login authentication, the quick authentication does not require the login name and the password, thus allows the user to log in easily, and is a useful authentication method at the time when sudden login is required such as during a business trip.

The quick authentication is also convenient in a point that a login operation is simplified and individual settings can be called promptly.

The quick authentication is highly convenient for the login operation, just as described. However, manual settings are required as in the related art when the setting such as of a printing condition is made after login. Thus, the quick authentication remains bothersome.

As the invention that facilitates setting such as of the printing condition after the login, the invention of an image forming apparatus that, when executing an image forming job, automatically stores user settings for setting items of the image formation job, thereafter makes an operating user select and set the appropriate user setting from the stored user settings, and thus can store the user setting without manually storing troublesome setting values is conventionally disclosed (see, for example, Japanese Unexamined Patent Application Publication No. 2006-39470).

However, in order to check whether the settings such as of the printing condition after the quick authentication are the settings intended by the user, the user has to check setting screens one by one, which is extremely troublesome.

In addition, there is a case where the same user frequently changes the settings. Thus, it is often difficult to know which settings are enabled until the settings are actually checked.

As a result, there occurs such a problem that, after the login, printing or the like is often performed with the settings unintended by the user.

The present invention has been made in view of the above circumstances, and an object of the present invention is to provide an image forming apparatus capable of registering and calling settings easily and promptly when compared to the related art.

SUMMARY OF THE INVENTION (1) The present invention provides an image forming apparatus that includes: an image former; a display that shows a setting screen related to image formation; an operator that accepts a command from a user; a storage; and a controller that controls the image former, the display, the operator, and the storage. In the case where the operator accepts a command to register setting at the time when the display shows the setting screen, the controller stores setting contents of the setting screen along with an image of the setting screen in the storage. In the case where the operator accepts a command to call the setting, the controller makes the display show a list of images of setting screens related to the setting contents stored in the storage. In the case where the operator accepts a command to select an image from the list of images of setting screens, the controller makes the display show a setting screen, to which setting contents related to a selected image are reflected.

In the present invention, the "image forming apparatus" is an apparatus that forms and outputs the image, and examples are a copier having a copying function such as a printer that uses an electrophotographic method for image formation by a toner and a multifunction peripheral (MFP) having functions other than the copying function.

The present invention provides the image forming apparatus capable of registering and calling the settings easily and promptly when compared to the related art.

Furthermore, preferred aspects of the present invention will be described.

(2) The image forming apparatus may further include a user authenticator. In the case where the operator accepts a command to register setting at the time when the display shows the setting screen after the user authenticator authenticates a user, the controller may store the setting contents of the setting screen along with the image of the setting screen and information on the authenticated user in the storage. In the case where the operator accepts a command to call the setting after the user authenticator authenticates the user, the controller may make the display show a list of images of setting screens related to the authenticated user among the setting contents stored in the storage.

The "user information" is information used to specify the user, and examples are a name, a face photograph, a mail address, and an ID number of the user.

In this way, since only the list of the setting screens registered by the login user is called, it is possible to realize the image forming apparatus capable of registering and calling the setting easily and promptly when compared to the related art.

(3) The image forming apparatus may further include an image input section where image data is input. In the case where the operator accepts a command to register setting at the time when the display shows a setting screen, setting contents of which can be set after the image data is input in the image input section, the controller may store setting contents of the setting screen before and after the input of the image data along with an image of the setting screen in the storage. In the case where the operator accepts a command to call the setting before the input of the image data, the controller may make the display show a list of images of setting screens related to the setting contents before the input of the image data, which are stored in the storage. In the case where the operator accepts a command to call the setting after the input of the image data, the controller may make the display show a list of images of setting screens related to the setting contents after the input of the image data, which are stored in the storage.

In this way, it is possible to prevent in advance such a problem that failure occurs or the setting contents are not reflected when resetting is made regardless of absence of the input data in the case where some of the items are set in the assumption that the input data exists as for the setting during scanning. Therefore, it is possible to realize the image forming apparatus capable of registering and calling the setting easily and promptly when compared to the related art.

(4) In the case where the operator accepts a command to register setting at the time when the display shows the setting screen, the controller may determine whether or not the setting contents of the setting screen overlap the setting contents already stored in the storage. In the case of overlapping, the controller may overwrite the setting contents already stored in the storage with the setting contents of the setting screen and store the setting contents of the setting screen along with the image of the setting screen in the storage.

In this way, it is possible to realize the image forming apparatus capable of registering and calling the settings easily and promptly when compared to the related art even in the case where the setting screen that overlaps the already registered setting screen is registered.

(5) The setting contents of the setting screen may include contents of image setting related to a background image of the setting screen and arrangement of images.

In this way, the user can easily save and call a screen configuration customized by the user without any special knowledge or procedure regarding the registration of the setting items or setting values. Therefore, it is possible to realize the image forming apparatus capable of registering and calling the setting easily and promptly when compared to the related art.

DESCRIPTION OF THE PREFERRED EMBODIMENTS

A detailed description will hereinafter be made on the present invention with reference to the drawings.

The following description is illustrative in all respects and thus should not be construed as limiting the present invention.

First Embodiment

A description will be made on a digital multifunction device 1 as an embodiment of an image forming apparatus according to the present invention with reference to FIG. 1 to FIG. 3.

Figure 1:
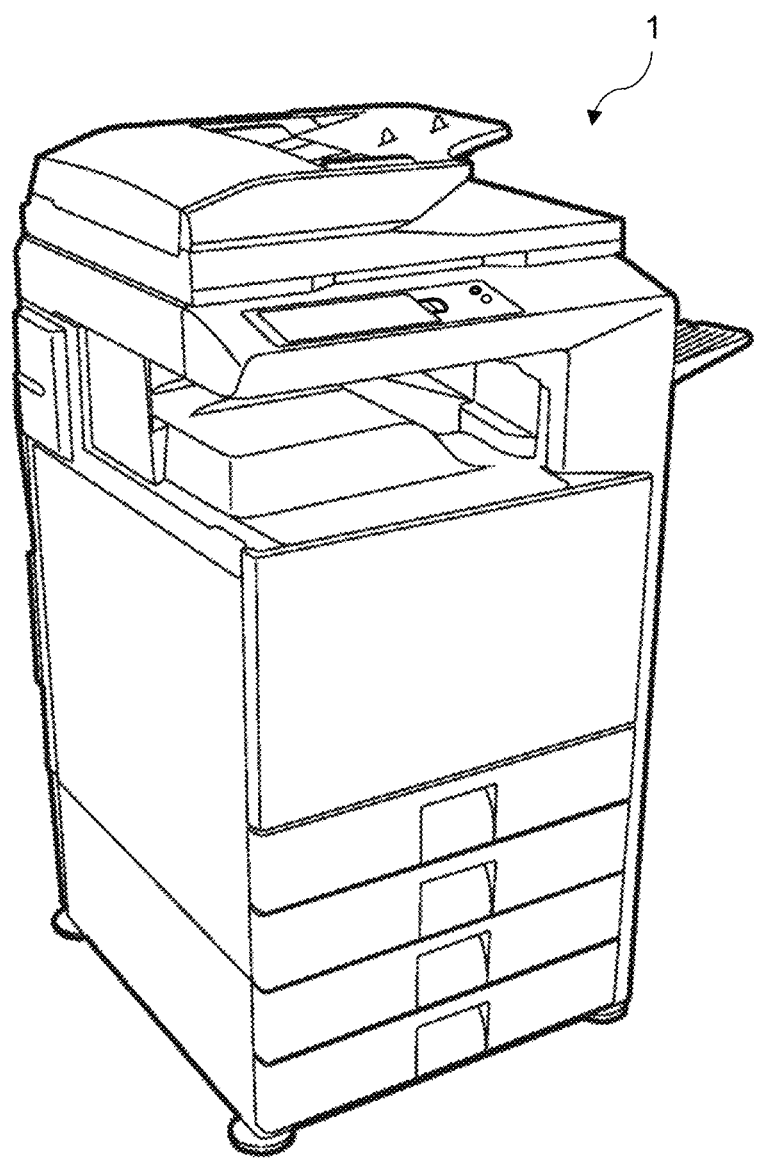
FIG. 1 is a perspective view of external appearance of a digital multifunction device according to a first embodiment of the present invention.

FIG. 1 is a perspective view of external appearance of the digital multifunction device 1 according to a first embodiment of the present invention. FIG. 2 is a block diagram of a schematic configuration of the digital multifunction device 1 illustrated in FIG. 1. FIG. 3 is an explanatory view of an example of a quick authentication screen provided by the digital multifunction device 1 illustrated in FIG. 1.

Note that the present invention is not only applied to the digital multifunction device 1 but can be applied to all devices having a login function, such as a personal computer and a smartphone.

The digital multifunction device 1 is a device such as a multifunction peripheral (MFP) that executes digital processing of image data and has a copier function, a scanner function, and a facsimile function.

The digital multifunction device 1 executes a job such as scanning, printing, copying, or image transmission on the basis of an instruction from a user that is received via an operator 172 or a communication part 15.

Figure 2:
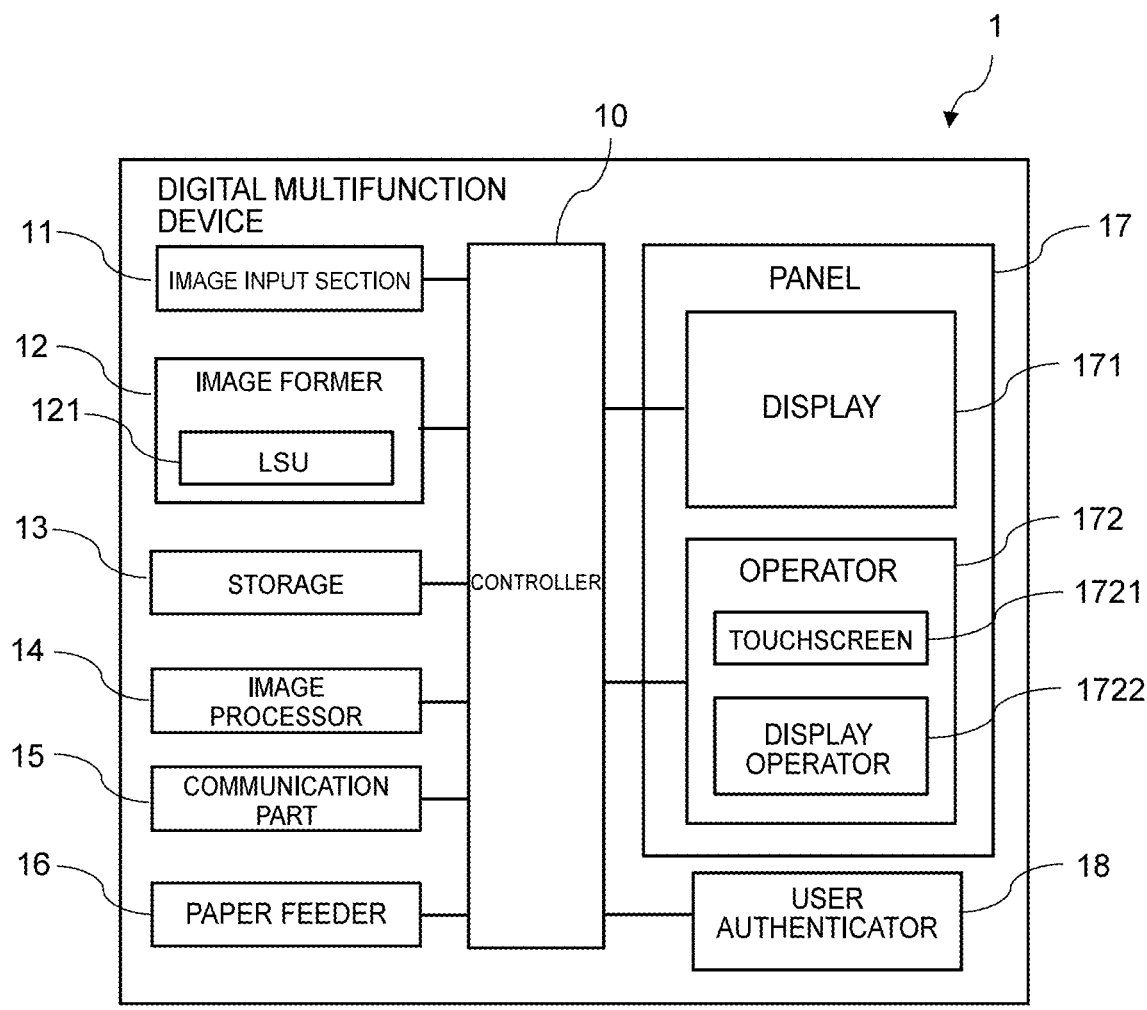
FIG. 2 is a block diagram of a schematic configuration of the digital multifunction device illustrated in FIG. 1.

As illustrated in FIG. 2, the digital multifunction device 1 comprises a controller 10, an image input section 11, an image former 12, a storage 13, an image processor 14, the communication part 15, a paper feeder 16, a panel 17, and a user authenticator 18.

A description will hereinafter be made on each component of the digital multifunction device 1.

The controller 10 integrally controls the digital multifunction device 1 and comprises a CPU, RAM, ROM, various interface circuits, and the like.

In order to control entire operation of the digital multifunction device 1, the controller 10 monitors and controls various loads such as detection of each sensor, a motor, a clutch, and the panel 17.

The image input section 11 is a part that detects and reads a document placed on a document table or a document conveyed from a document tray to generate the image data. The image input section 11 is also a part that acquires image data generated by an external information processor (not illustrated), a facsimile machine (not illustrated), or the like.

When acquiring the image data from the external information processor or the like, the image input section 11 may acquire the image data via a wired or wireless network, may acquire the image data recorded in a USB stick or the like, or may have a function that combines those.

The image former 12 is a part that prints out the image data, which is generated by the image processor 14, on a sheet and comprises an LSU 121.

The LSU 121 is a device that irradiates a surface of a charged photoconductor drum with a laser beam that corresponds to image information including a digital signal acquired by the image input section 11, so as to form an electrostatic latent image.

The storage 13 is an element or a storage medium that stores information required to realize various functions of the digital multifunction device 1, a control program, and the like. For example, a semiconductor element such as the RAM or the ROM, a hard disk, or a flash storage such as an SSD is used.

The program and data may be held in different devices such that an area for holding the data is a hard disk drive and an area for holding the program is the flash storage.

The image processor 14 is a part that converts a document image read by the image input section 11 into an appropriate electrical signal and generates an image data, and that executes processes the image data input from the image input section 11 in accordance with a command from the operator 172 so as to be suitable for output such as enlarging or reducing.

The communication part 15 is a part that communicates with a computer, a portable information terminal, the external information processor, or the facsimile machine via the network and exchanges various types of information such as an electronic mail and fax with any of these external communication devices.

The paper feeder 16 is a part that conveys the sheet stored in a paper feeding cassette and a manual feed tray to the image former 12.

The panel 17 comprises a display 171 and the operator 172.

The display 171 is a part that displays the various information. For example, the display 171 is a display that is constructed of a CRT display, a liquid crystal display, an EL display, or the like and that is a monitor, a line display, or the like used by an operating system or application software to display electronic data such as a processing state. The controller 10 displays the operation and a state of the digital multifunction device 1 through the display 171.

The operator 172 is a part that comprises a touchscreen 1721 and a display operator 1722 and that receives an input (a command) from the user.

The user authenticator 18 is a part that performs user authentication according to an authentication method selected by the user among multiple predetermined authentication methods such as IC card authentication, user login authentication, and quick authentication.

Figure 3:
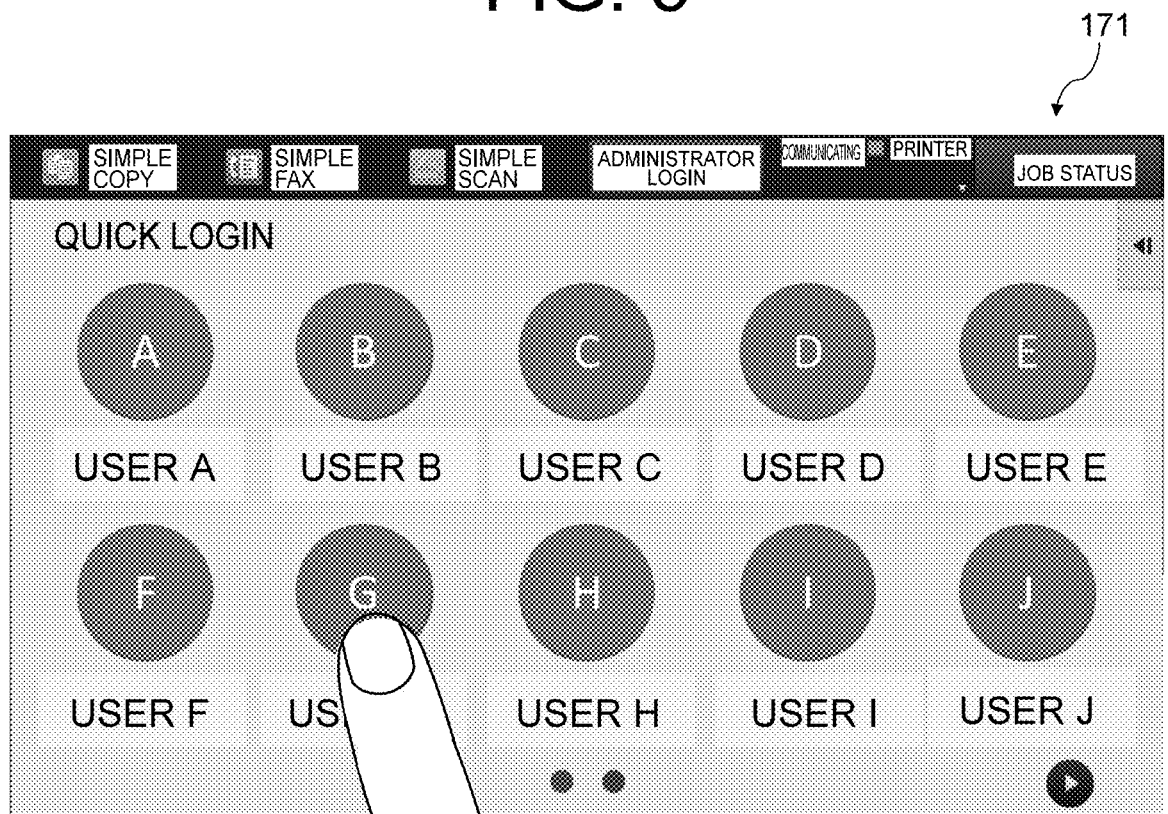
FIG. 3 is an explanatory view of an example of a quick authentication screen provided by the digital multifunction device illustrated in FIG. 1.

When performing the quick authentication, as illustrated in FIG. 3, the user authenticator 18 compares user information that is associated with a user image selected by the operator 172 with corresponding information that is recorded in the storage 13 in advance, so as to authenticate whether the user is a legitimate user.

When performing the login authentication, the user authenticator 18 compares the user information that is associated with information such as a login name and a password input from the operator 172 with the corresponding information that is recorded in the storage 13 in advance, so as to authenticate whether the user is the legitimate user.

The digital multifunction device 1 may receive the user information from the user's mobile terminal or the like via the communication part 15.

Example of Processing to Register Setting Contents of Digital Multifunction Device 1

Next, a description will be made on an example of settings on the digital multifunction device 1 according to the embodiment of the present invention with reference to FIG. 4 to FIG. 9.

Figure 4:
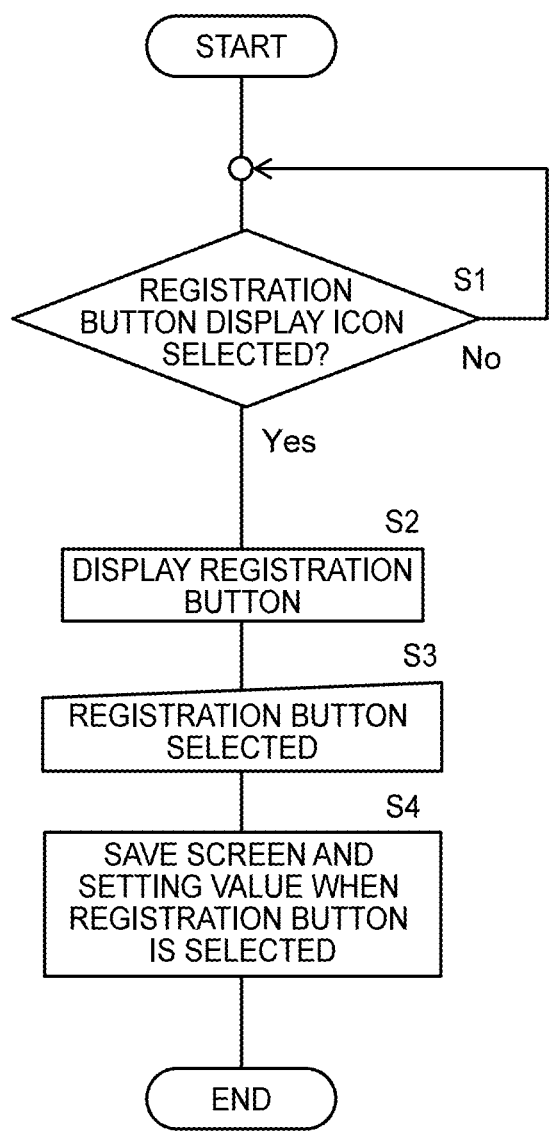
FIG. 4 is a flowchart of an example of processing to register setting contents of the digital multifunction device illustrated in FIG. 1.
Figure 5:
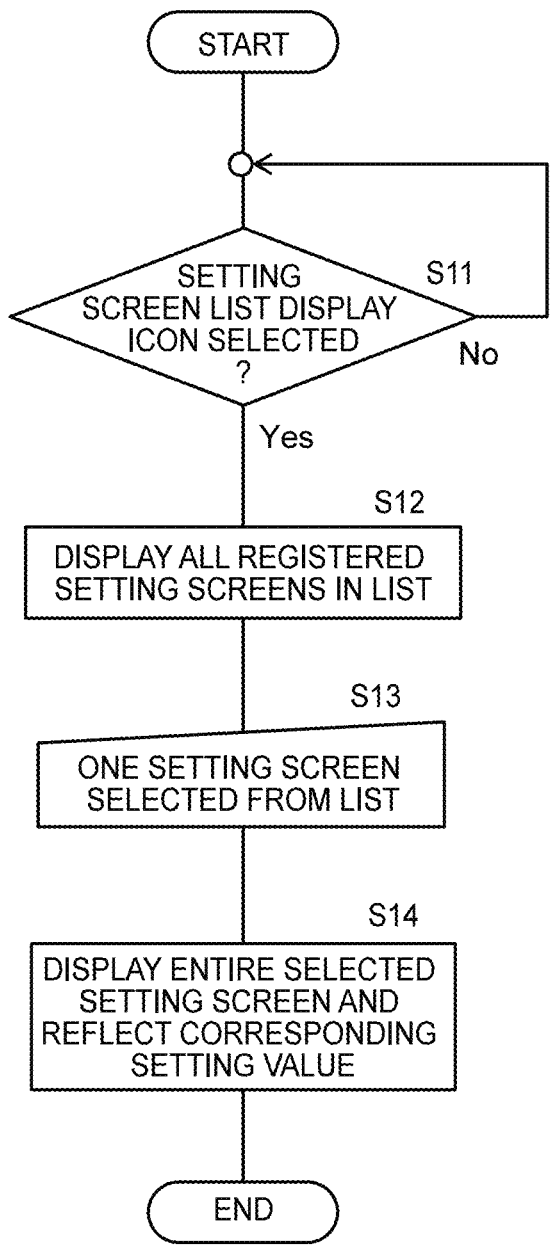
FIG. 5 is a flowchart of an example of processing to set registration contents of the digital multifunction device illustrated in FIG. 1.
Figure 6:
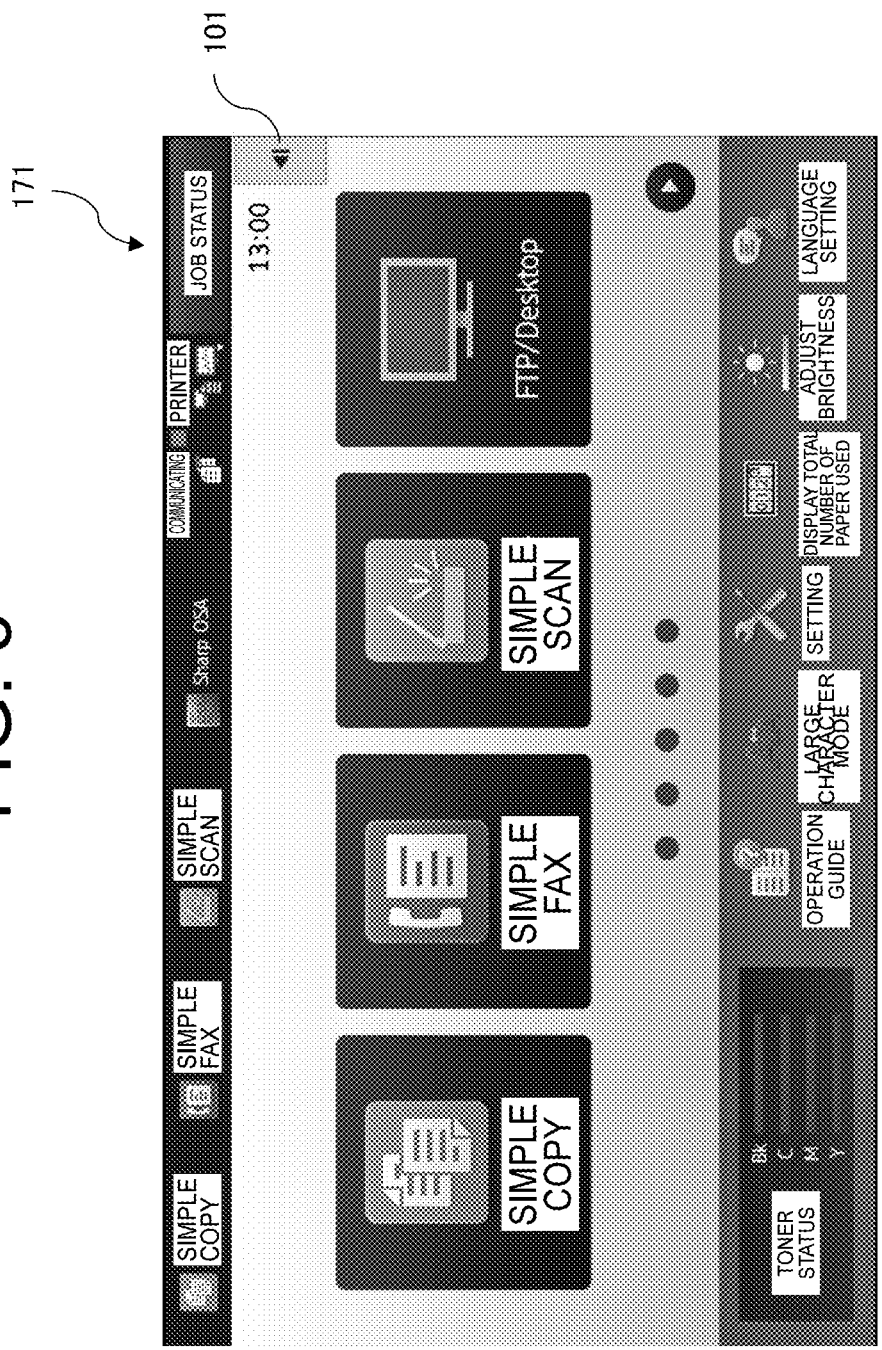
FIG. 6 is an explanatory view of an example of a screen that is displayed on a display of the digital multifunction device illustrated in FIG. 1.
Figure 7:
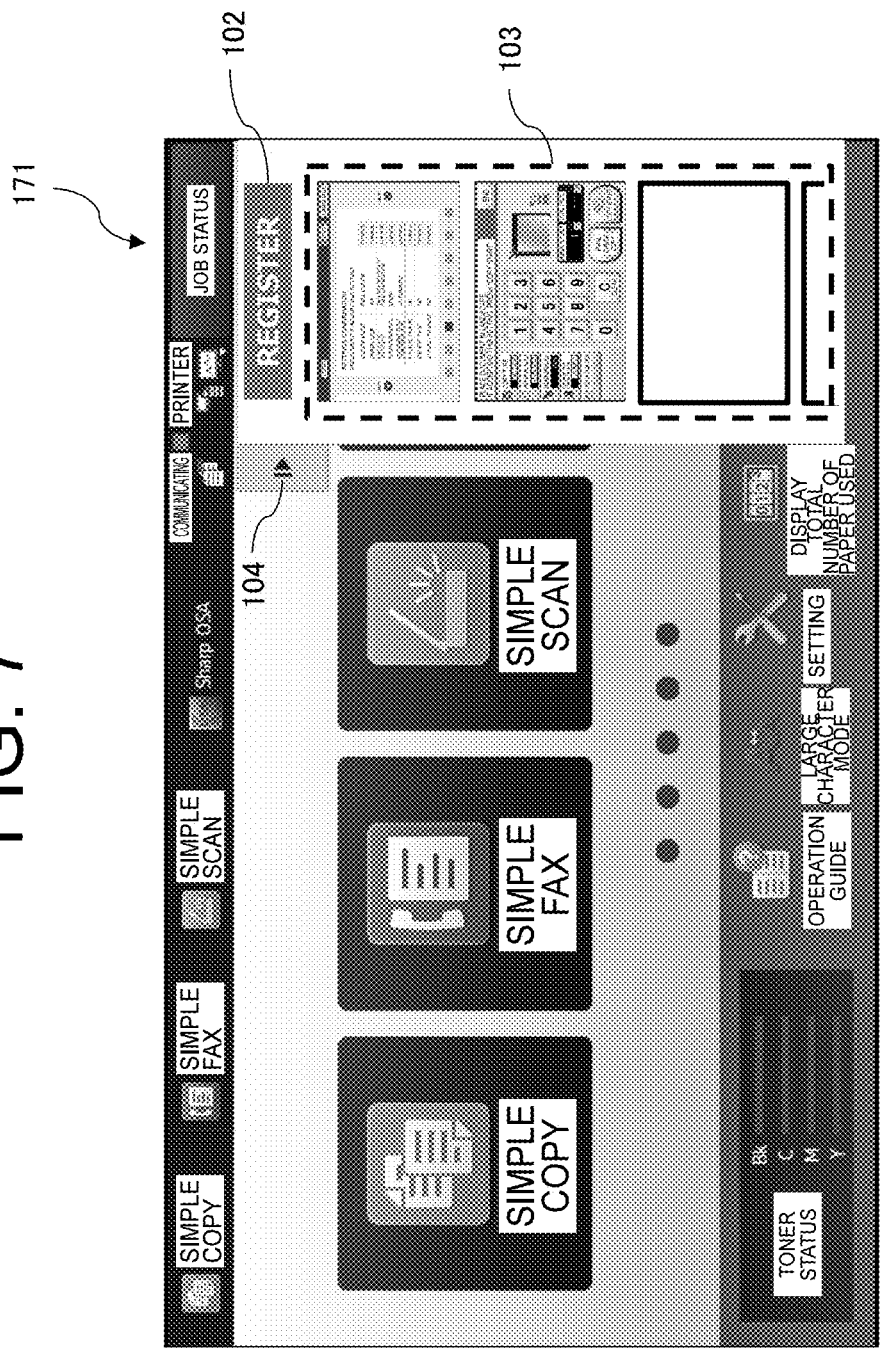
FIG. 7 is an explanatory view of an example of the screen that is displayed on the display of the digital multifunction device illustrated in FIG. 1.
Figure 8:
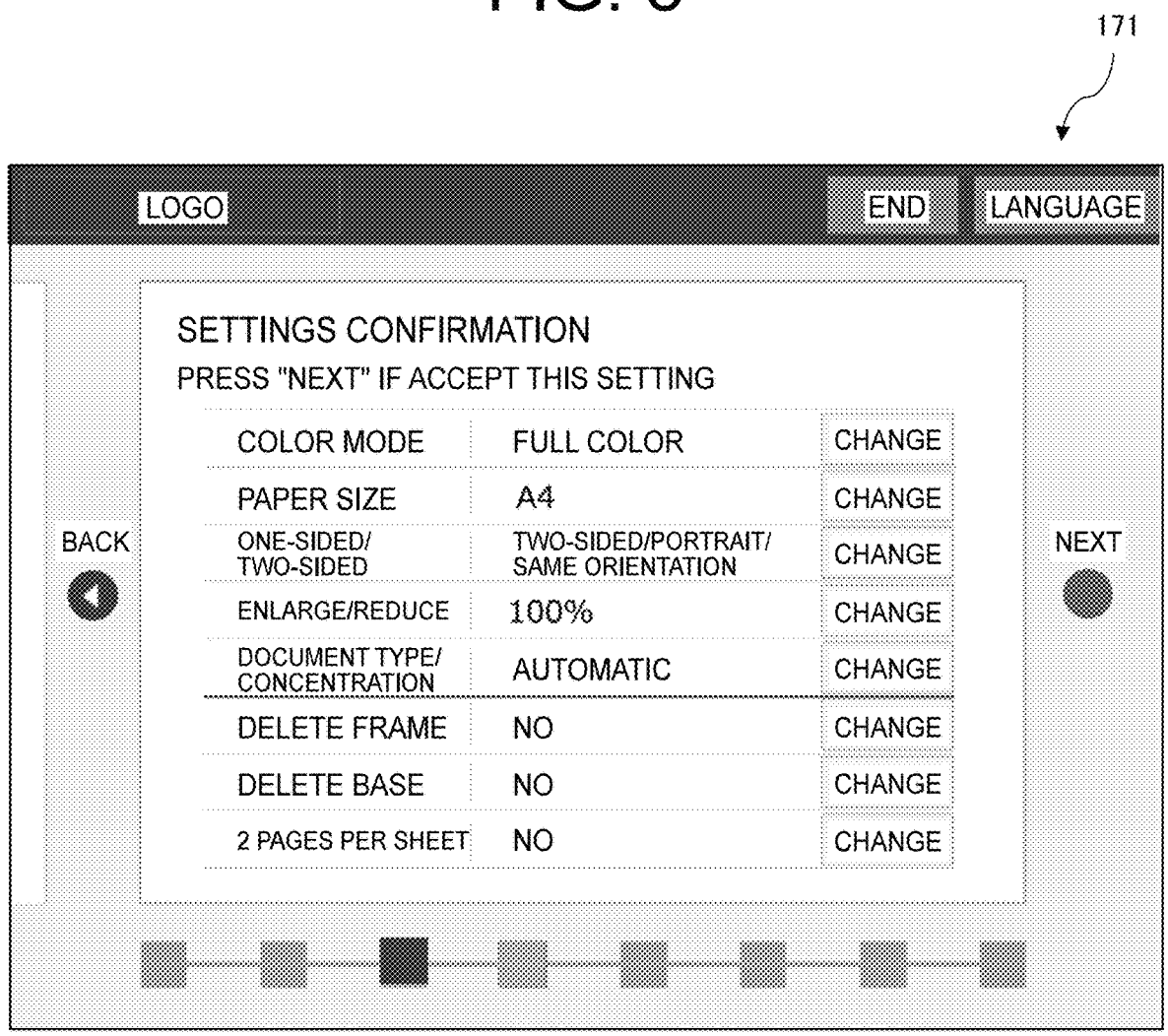
FIG. 8 is an explanatory view of an example of a setting screen that is displayed on the display of the digital multifunction device illustrated in FIG. 1.
Figure 9:
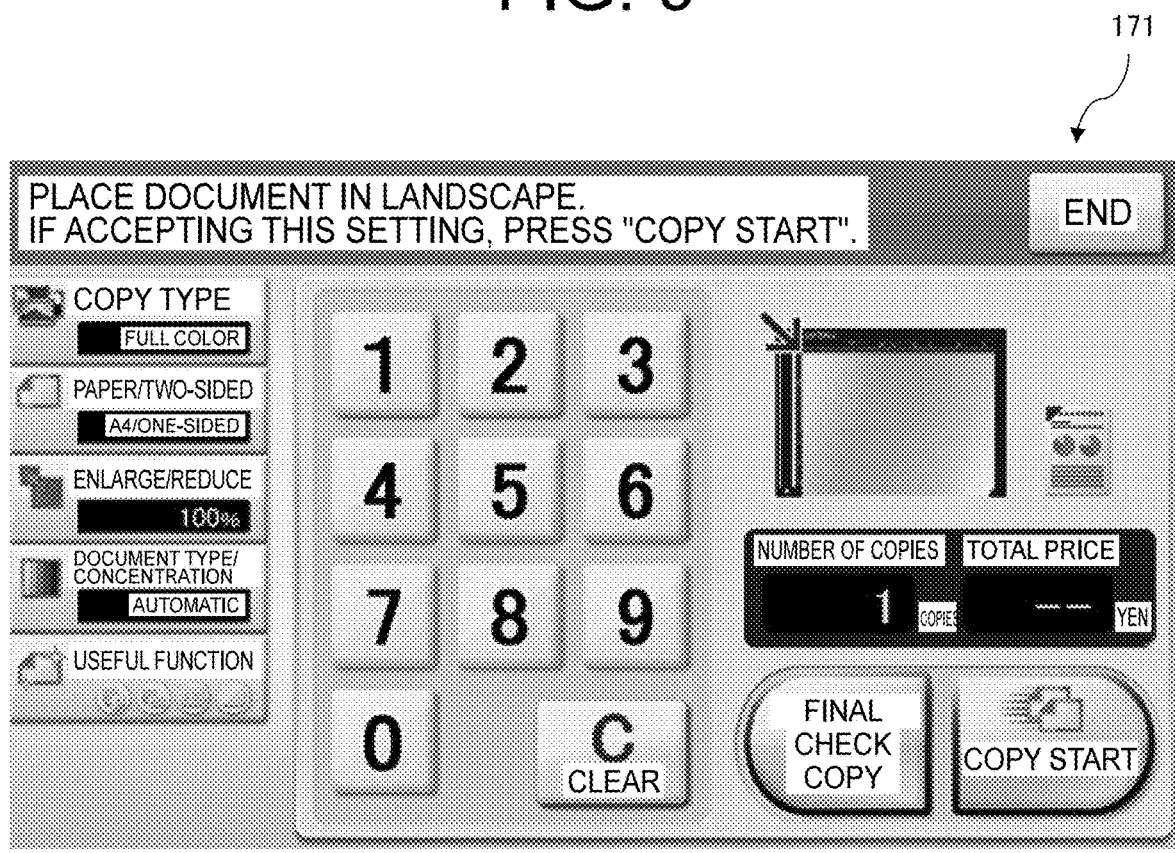
FIG. 9 is an explanatory view of an example of the setting screen that is displayed on the display of the digital multifunction device illustrated in FIG. 1.

FIG. 4 is a flowchart of an example of processing to register setting contents of the digital multifunction device 1 illustrated in FIG. 1. FIG. 5 is a flowchart of an example of processing to set registration contents of the digital multifunction device 1 illustrated in FIG. 1. FIG. 6 and FIG. 7 are each an explanatory view of an example of a screen that is displayed on the display 171 of the digital multifunction device 1 illustrated in FIG. 1. FIG. 8 and FIG. 9 are each an explanatory view of an example of a setting screen that is displayed on the display 171 of the digital multifunction device 1 illustrated in FIG. 1.

A description will be made on a flow of the processing to register the setting contents of the digital multifunction device 1 with reference to FIG. 4.

In step S1 of FIG. 4, the controller 10 determines whether a registration button display icon 101 is selected (step S1).

As illustrated in FIG. 6, the registration button display icon 101 is displayed as an icon including a left-pointing arrow in an upper right portion of a screen that is displayed on the display 171.

If the registration button display icon 101 is selected in step S1 of FIG. 4 (if the determination in step S1 is Yes), in step S2, the controller 10 displays a registration button 102 (step S2).

In FIG. 6, if the registration button display icon 101 is selected, the registration button 102 is displayed as illustrated in FIG. 7.

At this time, the user may be able to return to the screen illustrated in FIG. 6 by selecting a registration button non-display icon 104.

Next, if the registration button 102 is selected in step S3 of FIG. 4 (step S3), in step S4, the controller 10 stores a setting screen and a setting value at the time of selecting the registration button 102 in the storage 13 (Step S4), and terminates the registration processing.

Next, a description will be made on a flow of the processing to set the registration contents of the digital multifunction device 1 with reference to FIG. 5.

In step S11 of FIG. 5, the controller 10 determines whether a setting screen list display icon is selected (step S11).

In FIG. 6, as the setting screen list display icon, the same icon as the registration button display icon 101 is used. However, a separate icon may be displayed on the display 171.

If the setting screen list display icon is selected in step S11 of FIG. 5 (if the determination in step S11 is Yes), in step S12, the controller 10 displays a list of all the registered setting screens (step S12).

A list 103 of the registered setting screens may be arranged such that the newly registered setting screen is positioned at the top, or may be arranged in an order of the called number of the setting screens in the past.

Next, if one of the registration screens is selected from the list in step S13 (step S13), in step S14, the controller 10 displays the selected setting screen on the whole display 171 and reflects the setting values corresponding to the setting screen (Step S14).

In the example illustrated in FIG. 7, in the case where the top setting screen is selected from a list 103 of the setting screens, as illustrated in FIG. 8, the selected setting screen is displayed on the whole display 171.

The setting values at this time reflects the registered settings.

Additionally, in the example illustrated in FIG. 7, in the case where the second setting screen from the top is selected from the list 103 of the setting screens, as illustrated in FIG. 9, the selected setting screen is displayed on the whole display 171.

The setting values at this time reflects the registered settings.

As described above, when the registration button 102 is selected, the setting values are saved in association with the setting screen, and when one of the setting screens is selected from the list 103 of the registered setting screens, the setting screen, in which the associated setting values are reflected, is displayed on the display 171.

Accordingly, the user can easily save setting items by simply pressing the registration button 102 without opening the setting screen.

In addition, since the user can check the list 103 of the setting screens, which is displayed on the display 171, and easily calls the desired setting screen by selecting the desired setting screen, it is possible to realize the digital multifunction device 1 capable of registering and calling the settings easily and promptly when compared to the related art.

Modification 1

As a modification of the first embodiment, not only the setting screens but also settings of a screen configuration, such as settings of wall paper and a button layout, that are customized by the user may be saved.

In this way, it is possible to realize the digital multifunction device 1 with which the user can easily and promptly save the settings of the customized screen configuration without special knowledge or a special procedure of registration of the setting items and the setting values when compared to the related art.

Second Embodiment

Next, a description will be made on a flow of processing to set registration contents of the digital multifunction device 1 according to a second embodiment of the present invention with reference to FIG. 10.

Figure 10:
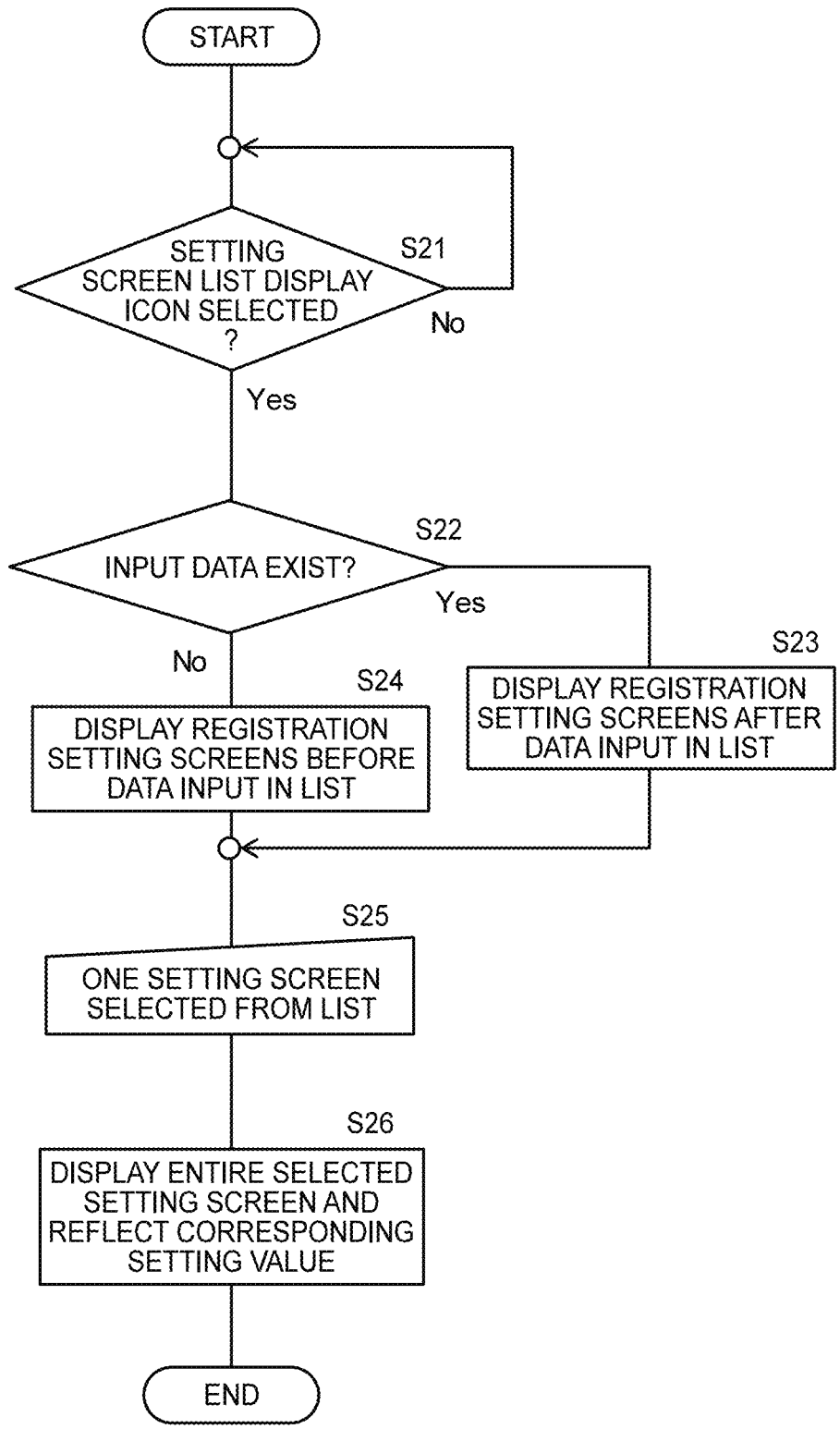
FIG. 10 is a flowchart of an example of processing to set the registration contents of the digital multifunction device illustrated in FIG. 1.

FIG. 10 is a flowchart of an example of the processing to set the registration contents of the digital multifunction device 1 illustrated in FIG. 1.

Note that, since processing in steps S21, S25, and S26 in FIG. 10 corresponds to the processing in steps S1, S13, and S14 in FIG. 5, the description thereon will not be made.

A description will herein be made on processing in steps S22 to S24, which differs from FIG. 5.

If the setting screen list display icon is selected in step S21 of FIG. 10 (if the determination in step S21 is Yes), in step S22, the controller 10 determines whether input data exists (step S22).

Here, in regard to the job such as scanning, the setting contents of which differs by presence or absence of the input data that can be acquired by scanning the document, some items are set in the assumption that the input data exists. Thus, the different processing is executed depending on the presence or the absence of the input data.

For example, when an A4-sized document is scanned, the list of the setting screens for the A4-sized document is displayed. However, prior to scanning of the document, the list of the setting screens for the document in any size is displayed.

More specifically, if the input data exists in step S22 (if the determination in step S22 is Yes), in step S23, the controller 10 displays the list of all the setting screens that are registered after the data input (step S23).

On the other hand, if the input data does not exist (if the determination in step S22 is No), in step S24, the controller 10 displays all the setting screens that are registered before the data input (step S24).

After finishing the processing in step S23 or S24, the controller 10 executes the processing in step S25 (step S25).

In this way, it is possible to realize the digital multifunction device 1 capable of preventing such a problem that failure occurs or the setting contents are not reflected when resetting is made regardless of the absence of the input data in the case where some of the items are set in the assumption that the input data exists in the scanning job.

Third Embodiment

As a third embodiment, in the case where the registration button 102 is selected for the setting that overlaps the already registered setting, the old setting may be overwritten with the new setting, or a message "The same setting is already registered. Are you sure you want to register?" may be displayed on the display 171 when the registration button 102 is selected.

In the case where the setting contents are the same but the screen configuration, such as the settings of the wallpaper and the button layout, that is customized by the user differs, the setting contents may be saved as the separate setting screen.

In this way it is possible to realize the digital multifunction device 1 capable of registering and calling the settings easily and promptly when compared to the related art even in the case where the setting that overlaps the already registered setting is registered.

Fourth Embodiment

As a fourth embodiment, only the setting screens that are related to the currently displayed job screen on the display 171 may be displayed in the list 103 of the setting screens.

For example, in the case where a screen related to printing job is displayed on the display 171 and where the user selects the setting screen list display icon, only the list 103 of the setting screens that are related to print settings is displayed.

Meanwhile, in the case where an initial screen such as a portal screen is displayed on the display 171 and where the user selects the setting screen list display icon, the list 103 of all the setting screens is displayed.

In this way, only the setting screens that are related to the current job are displayed to the user as the list 103 of the setting screens. Thus, it is possible to realize the digital multifunction device 1 capable of registering and calling the settings easily and promptly when compared to the related art.

Modification

As a modification of the fourth embodiment, in the case where the user selects one of the setting screens at the time when only the setting screens related to the current job are displayed as the list 103 of the setting screens, a setting change from the current setting may be displayed on the display 171, and a message that makes the user confirm the change may be displayed.

For example, in the case where a setting of a color mode of the setting screen that is selected by the user is "monochrome" at the time when the current setting of the color mode is "full color", the following message is displayed on the display 171 to urge the user to confirm.

"The color mode will be changed from "full color" to "monochrome". If you accept this, press OK."

In this way, when the setting screen is changed, which setting is changed is displayed on the display 171, and thus the change is clarified. Thus, it is possible to realize the digital multifunction device 1 capable of registering and calling the settings easily and promptly when compared to the related art.

Fifth Embodiment

As a fifth embodiment, in the case where a screen related to sharing among the multiple users is displayed, the setting screen registered by each of the users may be displayed in the list 103 of the setting screens.

At this time, in order to understand the difference between users at a glance, a mark such as a user name or a user icon may be displayed on each of the setting screens.

In this way, even in the case where the multiple users use the shared setting screen, the individual settings by each of the users can be easily called. Thus, it is possible to realize the digital multifunction device 1 capable of registering and calling the settings easily and promptly when compared to the related art.

The preferred aspect of the present invention includes a combination of any of the above-described multiple embodiments.

In addition to the above-described embodiments, there can be various modified embodiments of the present invention. Those modified embodiments should be construed to fall within the scope of the present invention. The present invention should include all modifications that fall within the scope and equivalents in meaning of the claims.

What is claimed is:

1. An image forming apparatus comprising:
   an image former;
   a display that shows a setting screen related to image formation;
   an operator that accepts a command from a user;
   a storage; and
   a controller that controls the image former, the display, the operator, and the storage, wherein
   if the operator accepts a command to register setting when the display shows the setting screen, the controller stores setting contents of the setting screen along with an image of the setting screen in the storage,
   if the operator accepts a command to call the setting, the controller makes the display show a list of images of setting screens related to the setting contents stored in the storage, and
   if the operator accepts a command to select an image from the list of images of setting screens, the controller makes the display show a setting screen, to which setting contents related to a selected image are reflected.

2. The image forming apparatus according to claim 1, further comprising:
   a user authenticator, wherein
   if the operator accepts a command to register setting when the display shows the setting screen after the user authenticator authenticates a user, the controller stores setting contents of the setting screen along with an image of the setting screen and information on the user authenticated in the storage, and
   if the operator accepts a command to call the setting after the user authenticator authenticates the user, the controller makes the display show a list of images of setting screens related to the user authenticated among the setting contents stored in the storage.

3. The image forming apparatus according to claim 1, further comprising:
   an image input section where image data is input, wherein
   if the operator accepts a command to register setting when the display shows a setting screen, setting contents of which can be set after the image data is input in the image input section, the controller stores setting contents of the setting screen before and after input of the image data along with an image of the setting screen in the storage,
   if the operator accepts a command to call the setting before the input of the image data, the controller makes the display show a list of images of setting screens related to the setting contents before the input of the image data, which are stored in the storage, and
   if the operator accepts a command to call the setting after the input of the image data, the controller makes the display show a list of images of setting screens related to the setting contents after the input of the image data, which are stored in the storage.

4. The image forming apparatus according to claim 1, wherein
   if the operator accepts a command to register setting when the display shows the setting screen, the controller determines whether or not setting contents of the setting screen overlap setting contents already stored in the storage, and
   in a case of overlapping, the controller overwrites the setting contents already stored in the storage with the setting contents of the setting screen and stores the setting contents of the setting screen along with an image of the setting screen in the storage.

5. The image forming apparatus according to claim 1, wherein
   the setting contents of the setting screen include contents of image setting related to a background image of the setting screen and arrangement of images.

* * * * *